United States Patent
Levering et al.

(10) Patent No.: US 8,181,753 B2
(45) Date of Patent: May 22, 2012

(54) BRAKE DRUM WITH VENT HOLE AND COOLING SCOOP

(75) Inventors: Paul D. Levering, Cullman, AL (US);
Byron E. Cornett, Cullman, AL (US);
Timothy M. Yant, St. Michael, MN (US); John C. Hall, Hoover, AL (US);
Jeremy L. Zills, Cullman, AL (US)

(73) Assignee: Webb Wheel Products Inc., Cullman, AL (US)

( * ) Notice: Subject to any disclaimer, the term of this patent is extended or adjusted under 35 U.S.C. 154(b) by 952 days.

(21) Appl. No.: 12/158,196

(22) PCT Filed: Dec. 26, 2006

(86) PCT No.: PCT/US2006/049401
§ 371 (c)(1),
(2), (4) Date: Aug. 13, 2008

(87) PCT Pub. No.: WO2007/076156
PCT Pub. Date: Jul. 5, 2007

(65) Prior Publication Data
US 2009/0014263 A1    Jan. 15, 2009

Related U.S. Application Data

(60) Provisional application No. 60/754,010, filed on Dec. 23, 2005.

(51) Int. Cl.
*F16D 65/10*    (2006.01)
*F16D 55/40*    (2006.01)

(52) U.S. Cl. ............ 188/218 R; 188/264 R; 188/264 A; 188/264 AA; 301/6.3

(58) Field of Classification Search ............... 188/218 R, 188/264 R, 264 A, 264 AA; 301/6.3
See application file for complete search history.

(56) References Cited

U.S. PATENT DOCUMENTS
1,805,655 A    5/1931    Down
(Continued)

FOREIGN PATENT DOCUMENTS
GB    763304 A    12/1956
GB    1533317 A    11/1978

OTHER PUBLICATIONS

International Search Report, PCT/US2006/049401, dated Jul. 18, 2007.
(Continued)

*Primary Examiner* — Bradley King
*Assistant Examiner* — Mahbubur Rashid
(74) *Attorney, Agent, or Firm* — IpHorgan Ltd.

(57) ABSTRACT

One embodiment of a brake drum includes a cylindrical main body portion, a brake drum mounting flange portion, a brake drum transition portion, the brake drum transition portion extending between the cylindrical main body portion and the mounting flange portion, the transition portion having a plurality of vent openings, and one air scoop secured at each of the vent openings, whereby rotation of the brake drum and air scoop induces air movement within a brake drum cavity defined by the main body portion. Each air scoop defines a louver opening which faces the angular direction of drum rotation, an air channel in fluid communication with the louver opening and the brake drum cavity, and a deflection surface located in the air channel. The deflection surface is positioned to re-direct air movement entering the louver opening at an angular direction, to a generally radial and inboard direction.

10 Claims, 8 Drawing Sheets

U.S. PATENT DOCUMENTS

| | | | | |
|---|---|---|---|---|
| 1,881,002 A | * | 10/1932 | Udale | 188/264 R |
| 2,088,967 A | * | 8/1937 | Main | 188/264 R |
| 2,237,164 A | | 4/1941 | Rosenberg | |
| 2,248,707 A | * | 7/1941 | Horn | 188/264 R |
| 2,489,522 A | * | 11/1949 | Chase | 188/218 A |
| 2,659,459 A | | 11/1953 | Lyon | |
| 2,717,059 A | * | 9/1955 | Lyon | 188/264 R |
| 2,896,749 A | | 7/1959 | Gaylord | |
| 3,127,959 A | | 4/1964 | Wengrowski | |
| 4,989,697 A | | 2/1991 | Denton | |

OTHER PUBLICATIONS

International Preliminary Report on Patentability, PCT/US2006/049401, dated Apr. 9, 2008.

* cited by examiner

BRAKE DRUM WITH VENT HOLE AND COOLING SCOOP

CROSS-REFERENCE TO RELATED APPLICATION

This application claims the benefit of U.S. Provisional Application No. 60/754,010, filed Dec. 23, 2005.

TECHNICAL FIELD

The present invention relates to providing air flow to a vehicle brake drum during operation of a vehicle such as a truck, bus and trailer, and, in particular, to enhancing the ventilation of a vehicle brake drum having vent holes.

BACKGROUND OF THE INVENTION

The prior art includes brake drums for vehicles, including medium and heavy-duty trucks, trailers and buses. In order to slow or stop a moving vehicle, the braking mechanism is activated to urge the brake shoes and brake lining into engagement with the friction surface of the brake drum. The frictional engagement of the brake lining with the brake drum causes the vehicle to slow or stop. However, in the process, the kinetic energy of the moving vehicle is converted into heat. Further, the frictional engagement causes wear on the brake lining which produces debris in the form of brake dust. Over time, a substantial amount of brake dust may accumulate within the brake drum and surrounding area. The accumulation of brake dust impairs the performance of the brake system, such as reducing the effectiveness to dissipate heat, and creating noise during operation of the brake system. Still further, road debris enters the brake drum and further impairs performance of the brake drum.

The prior art includes various means for providing and enhancing cooling and ventilation to the brake drum, in order to remove the heat, debris and lessen noise. For example, U.S. Pat. No. 3,127,959 is directed to a cooling device for brake drums and shoes. The cooling device is installed within the brake drum. In particular, the cooling device includes a disc, the body of which is provided with a plurality of vanes which form air circulating blades when the disc is rotated. The disc is placed over the outer diameter of the wheel hub. The brake drum is then installed and receives the disc within a cavity formed by the brake drum. A magnet secured to the disc draws and holds the disc axially of the drum by magnetic force on the hub flange. U.S. Pat. No. 4,989,697 is directed to a cooling, cleaning and drying means for brake drums. In particular, a generally circular elongated flexible air scoop strip is provided and includes mounting holes and outwardly protruding air scoops. The strip is mounted within the brake drum and secured in place via bolts which extend through the mounting holes and through the brake drum.

The prior art also includes cooling devices which are installed on an exterior surface of the brake drum. For example, U.S. Pat. No. 2,896,749 discloses a brake drum cooling device having a plurality of ring segments joined together at their ends by means of turnbuckles. The turnbuckles serve to clamp the segments against the outer surface of the flange of a brake drum. U.S. Pat. No. 2,659,459 discloses a brake cooling ring which is secured to the outer surface of the brake drum via bolts which extend from the hub and through the brake drum.

It is also known to provide full cast transit brake drums with vent openings.

While advancements have been made to address the foregoing and other related problems, there still exists a need for further improvements.

SUMMARY OF THE INVENTION

It is an object of the present invention to provide a brake drum having improved ventilation.

It is a feature of the present invention to provide improved cooling features.

It is a further feature of the present invention to provide a brake drum with improved cleaning capability.

It is still a further feature of the present invention to provide a brake drum having features which reduce the tendency for certain operational noise.

It is still a further feature of the invention to provide a device which may be retrofitted to brake drums to enhance the ventilation of the brake drum.

It is still yet a further feature to provide a ventilation device which may be installed on a brake drum, regardless of whether the brake drum is to be installed on the left or right side of a vehicle.

The present invention therefore provides a brake drum having a cylindrical main body portion, a brake drum mounting flange portion, a brake drum transition portion, the brake drum transition portion extending between the cylindrical main body portion and the mounting flange portion, the transition portion having at least one vent opening, and an air scoop secured at the vent opening, whereby rotation of the brake drum and air scoop induces air movement within a brake drum cavity defined by the main body portion.

The present invention also provides a brake drum comprising a cylindrical main body portion, a brake drum mounting flange portion a brake drum transition portion, the brake drum transition portion extending between the cylindrical main body portion and the mounting flange portion, the transition portion having an outer surface and at least one vent opening; and an air scoop secured at the vent opening, the air scoop includes a louver opening and extends outwardly from the outer surface of the brake drum transition portion, whereby rotation of the brake drum and air scoop induces air movement within a brake drum cavity defined by the main body portion.

The present invention further provides a brake drum comprising a cylindrical main body portion defining a brake drum cavity, a brake drum mounting flange portion, a brake drum transition portion, the brake drum transition portion extending between the cylindrical main body portion and the mounting flange portion, the transition portion having an outer surface and a plurality of vent openings, and an air scoop secured at each vent opening and which extends outwardly from the outer surface of the braked drum transition portion, each air scoop defines a louver opening which faces the angular direction of drum rotation, an air channel in fluid communication with the louver opening and the brake drum cavity, and a deflection surface located in the air channel, the deflection surface positioned to re-direct air movement entering the louver opening at an angular direction, to a generally radial and inboard direction, whereby rotation of the brake drum and air scoop induces air movement within the brake drum cavity.

DETAILED DESCRIPTION OF THE INVENTION

Figure 1:
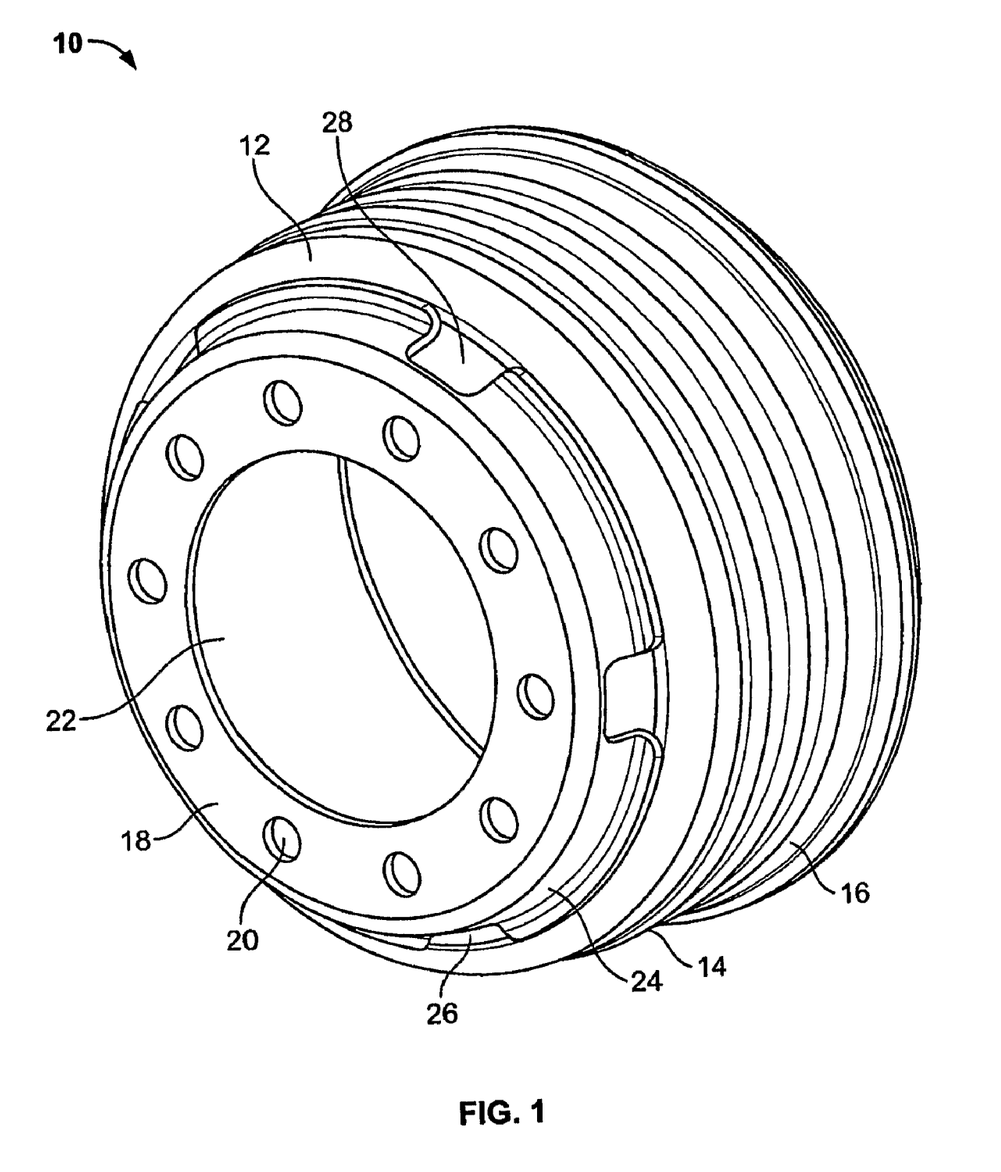
FIG. 1 shows a perspective view of a brake drum having vent holes in accordance with the present invention.

FIG. 1 discloses a two-piece composite brake drum 10. The brake drum shown in FIG. 1 is designed for installation at the rear of a vehicle. Although FIG. 1 shows a rear two-piece composite brake drum, it will become apparent, from the further description, that the present invention is not limited to a two-piece composite drum, nor a rear drum. In fact, the present invention relates to brake drums in general. The particular brake drum shown in FIG. 1 includes a cylindrical main body portion or a steel shell portion 12 having a ribbed portion 14 and a squealer band 16. A mounting flange portion 18 is also shown and includes a plurality of lug bolt openings 20 and a pilot hole 22. The mounting flange portion also includes a transition portion 24 having a plurality of notches 26. The mounting flange portion attaches to the cylindrical main body portion with a transition portion whereupon the notches form a plurality of vent openings 28.

Figure 2:
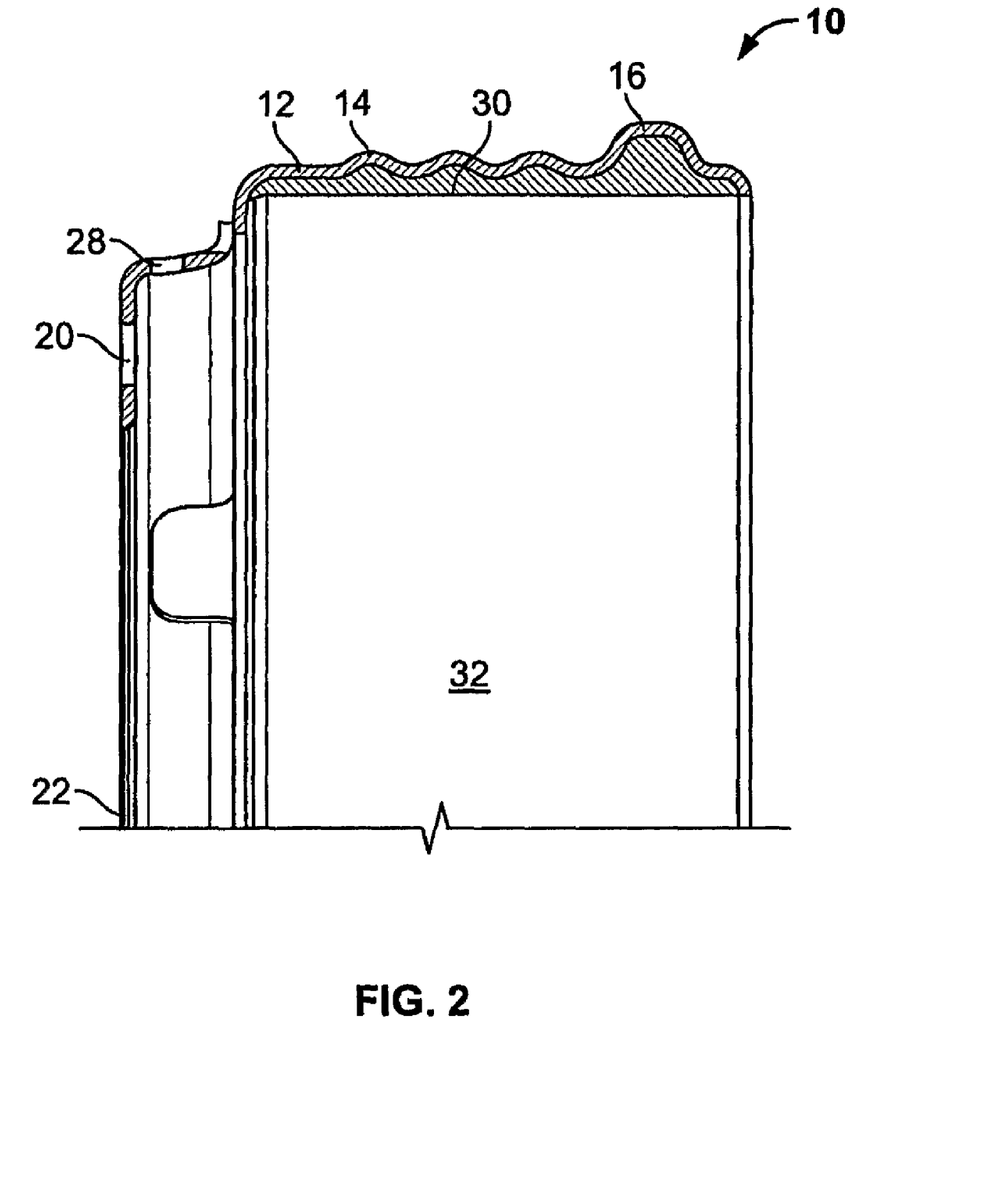
FIG. 2 shows a partial cross sectional view of the brake drum of FIG. 1.

FIG. 2 shows a partial cross sectional view of the brake drum of FIG. 1. FIG. 2 more readily shows the ribbed portions, and the squealer band. A brake liner portion or friction surface 30 is also shown. The mounting flange portion and steel shell portion form a brake drum cavity 32.

Figure 3:
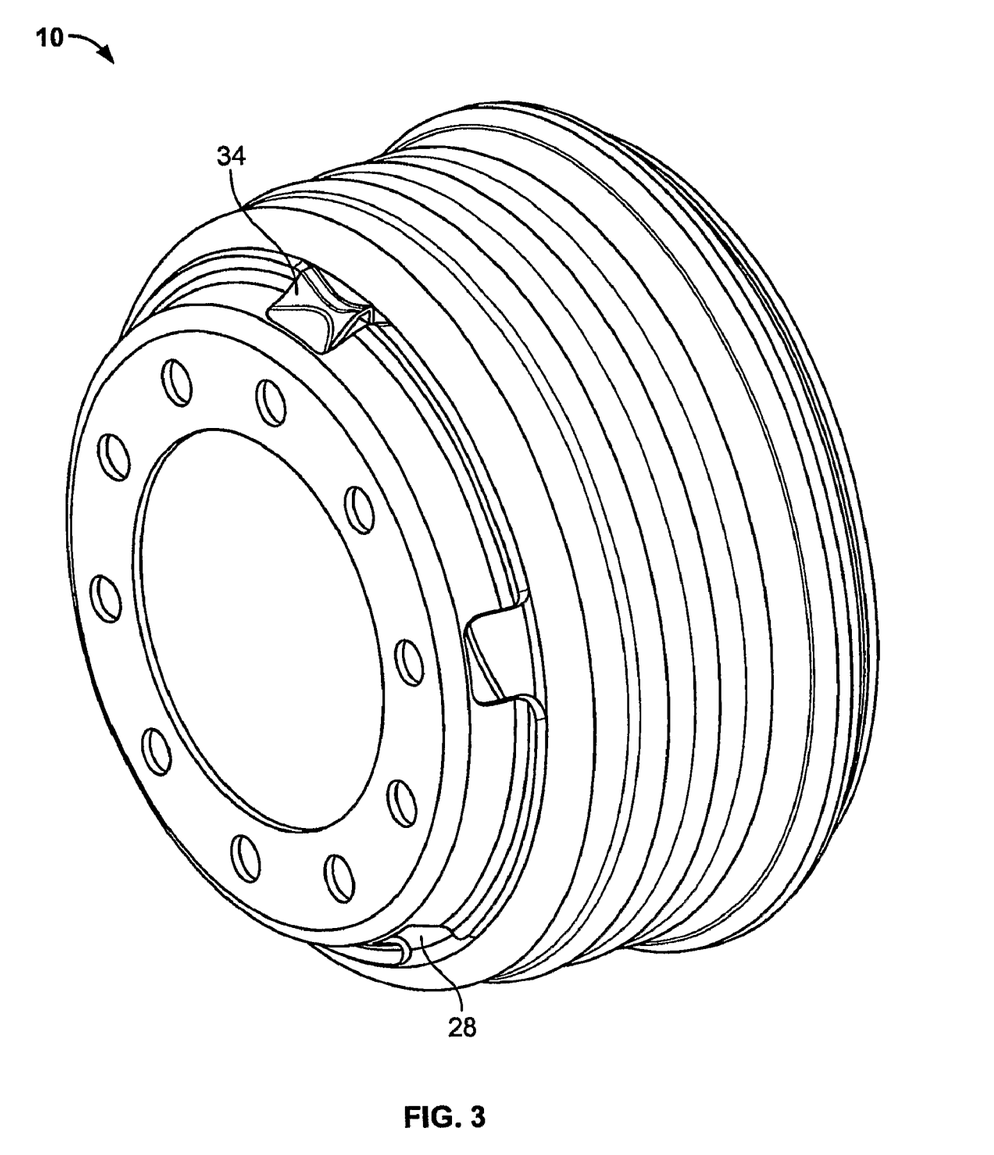
FIG. 3 shows a perspective view of the brake drum of FIGS. 1 and 2, wherein an air scoop has been installed at one of the air vents.

FIG. 3 is a perspective view of the brake drum shown in FIGS. 1 and 2. An air scoop 34 is shown mounted at one of the vent openings in accordance with the present invention. Final assembly of the two-piece composite brake drum in accordance with the present invention would normally include an air scoop at each of the vent openings.

Figure 4:
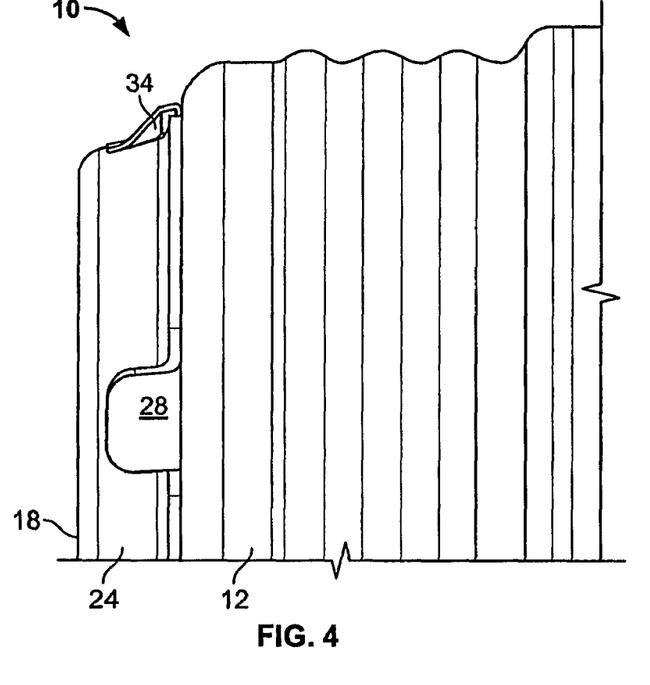
FIG. 4 shows a partial side view of the brake drum of FIG. 3, with the air scoop installed in accordance with the present invention.

FIG. 4 is a partial side view of the brake drum of FIG. 3. The side view of the air scoop 34 is shown at the top left of the figure.

Figure 5:
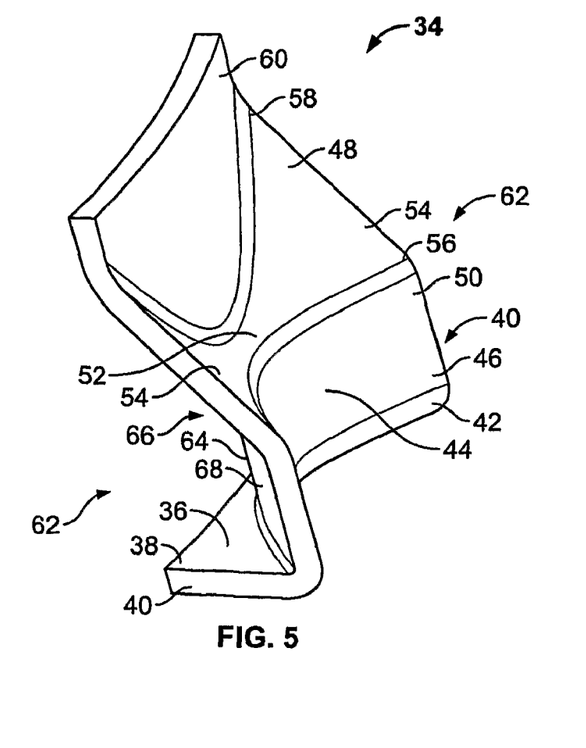
FIG. 5 shows a perspective view of the air scoop shown in FIGS. 3 and 4, in accordance with the present invention.

FIG. 5 is a perspective view of the air scoop 34 shown in FIGS. 3 and 4. The air scoop includes a generally flat side wall 36 having a bottom edge 38, side edges 40 and an upper edge 42. The upper edge defines a curved or concave profile. A curved or concave back wall 44 extends from a first longitudinal side 46 at a substantially right angle from the upper edge. A curved or webbed side wall 48 extends from a second longitudinal edge 50 of the back wall at a generally inclined angle and in a radial direction and towards the outboard side of the air scoop. The webbed side wall includes a narrow portion 52 which extends laterally in opposite directions in a diverging manner so as to form opposing wide end portions 54. The narrow portion extends further radially inward than does the opposing wide end portions. The webbed side wall defines an inboard curved edge 56 and an outboard curved edge 58. A main body portion 60 extends towards the outboard side from the outboard curved edge of the webbed side wall. The main body portion generally conforms with the transition portion of the mounting flange portion. The air scoop of FIG. 5 may be installed on a brake drum such as in FIGS. 3 and 4 via welding or similar mode of attachment such as known in the art. It will be also appreciated that the air scoop of FIG. 5 and as shown installed in FIGS. 3 and 4 is designed to operate on a brake drum regardless of whether the brake drum is mounted to the left side or the right side of a vehicle. In particular, the air scoop of FIG. 5 defines opposing louver openings 62 separated by a deflector surface 64 which is defined by a mid-portion 66 of the lower surface 68 of the curved or concave back wall.

Figure 6:
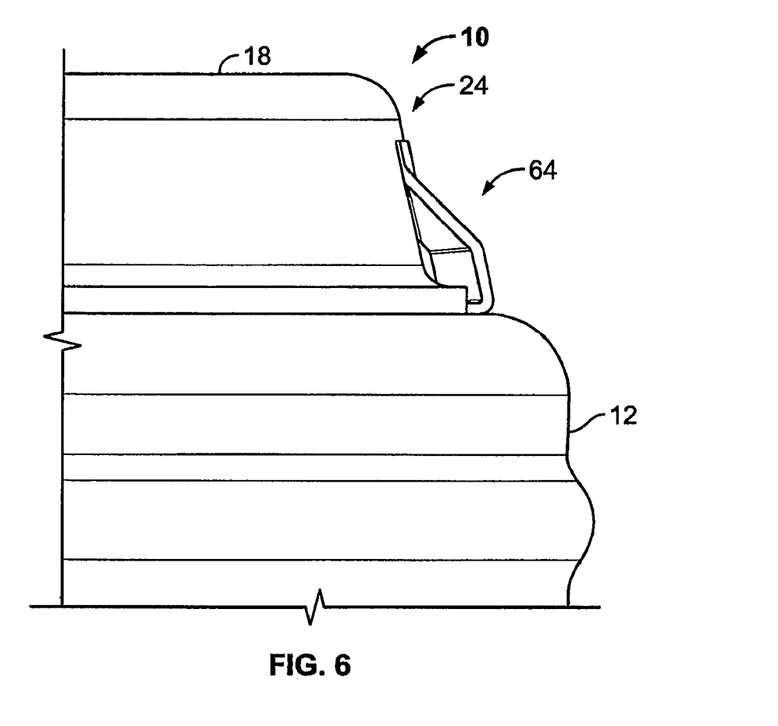
FIG. 6 shows a partial side view of a brake drum, for use at the front of a vehicle, having the air scoop of FIG. 5 installed in accordance with the present invention.

FIG. 6 is a partial side view of a brake drum which is adapted for installation at the front of a vehicle. The brake drum of FIG. 6 includes the air scoop 34 of FIG. 5.

Figure 7:
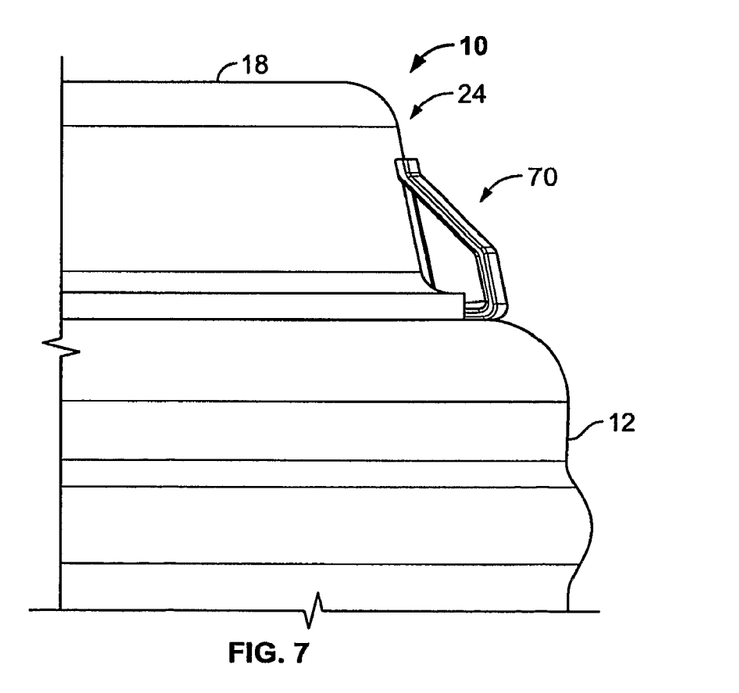
FIG. 7 shows a second embodiment of the present invention, wherein an air scoop is installed on a brake drum for use at the front of a vehicle.

FIG. 7 relates to a second embodiment of the present invention. A partial view of a brake drum is shown and which is adapted for installation at the front of a vehicle. The brake drum includes the cylindrical portion and the mounting flange portion having the transition portion. The transition portion includes a plurality of vent openings (not shown in FIG. 7) such as disclosed in the previous figures. FIG. 7 differs from that of FIG. 6 as to the embodiment of the air scoop 70 to which is shown secured to the transition portion and the cylindrical portion, such as via welding or other similar attachment means known in the art.

Figure 8:
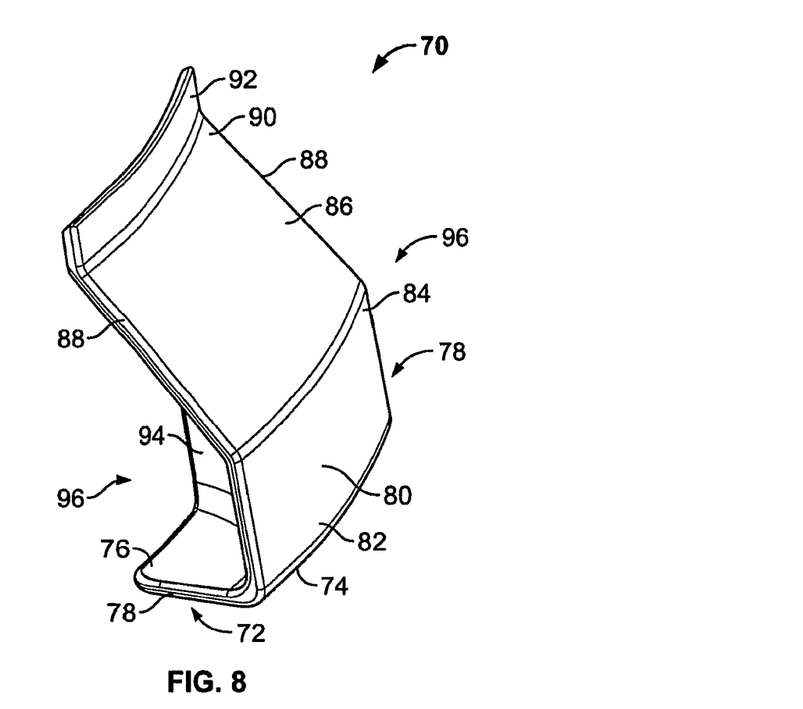
FIG. 8 is a perspective view of the air scoop shown in FIG. 7, in accordance with the present invention.

FIG. 8 shows a perspective view of the air scoop 70 of FIG. 7. The air scoop of FIG. 8 includes a flat inboard side wall 72 having an upper curved or convex edge 74, a lower edge 76 and two substantially flat side edges 78. A curved or convex back wall 80 is shown to include an inboard longitudinal edge 82 from which the back wall extends at a right angle from the inboard side wall. The back wall includes an outboard curved edge 84 from which an angled side wall 86 extends radially and towards the outboard side. The angled outboard side wall includes side edges 88 and a distal edge 90. A planar mounting flange 92 extends from the distal edge and generally conforms to the transition portion of the mounting flange. A deflective surface or webbed wall 94 extends generally from the flat inboard side wall, along the underside of the back wall, and to the underside of the side wall. It will be appreciated that the deflector surface or webbed wall may be substantially planar or may also be designed wherein the webbed wall extends radially outward and in a diverging manner forming a curved deflector surface on opposing sides of the louver openings 96. The air scoop of FIG. 8 maybe secure to the two-piece composite brake drum of FIG. 7 such as via welding or similar attachment means.

Figure 9:
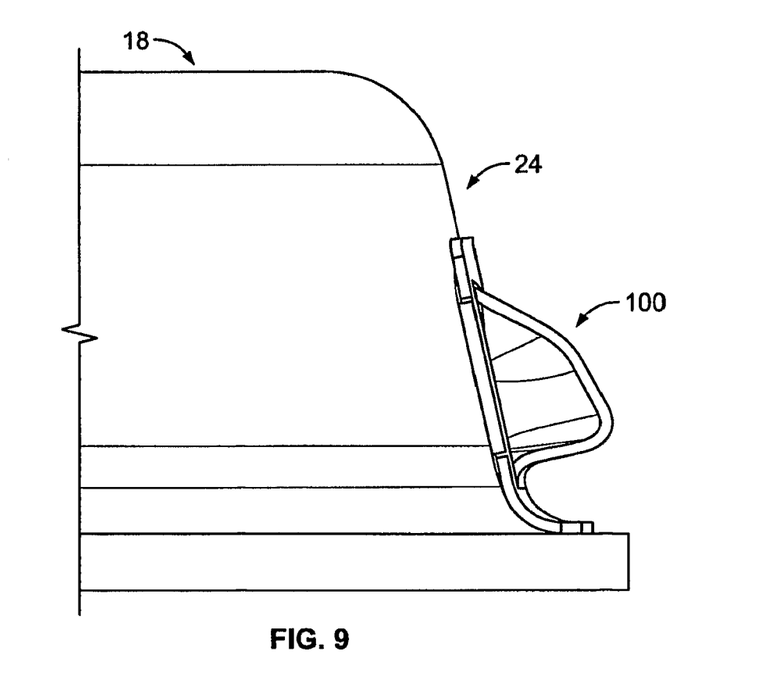
FIG. 9 is a third embodiment of the present invention and it shows a partial view of a mounting flange portion of a brake drum for use at the front of a vehicle, in accordance with the present invention.

FIG. 9 discloses a third embodiment of the present invention. In particular, a partial view of the mounting flange portion of a brake drum is shown. The mounting flange portion is adapted for installation at the front of a vehicle. The mounting flange portion includes the transition portion having a plurality of vent openings (not shown) in a manner similar to that shown in the previous figures. An air scoop 100 is shown secured to the transition portion over a vent opening in accordance to the present invention.

Figure 10:
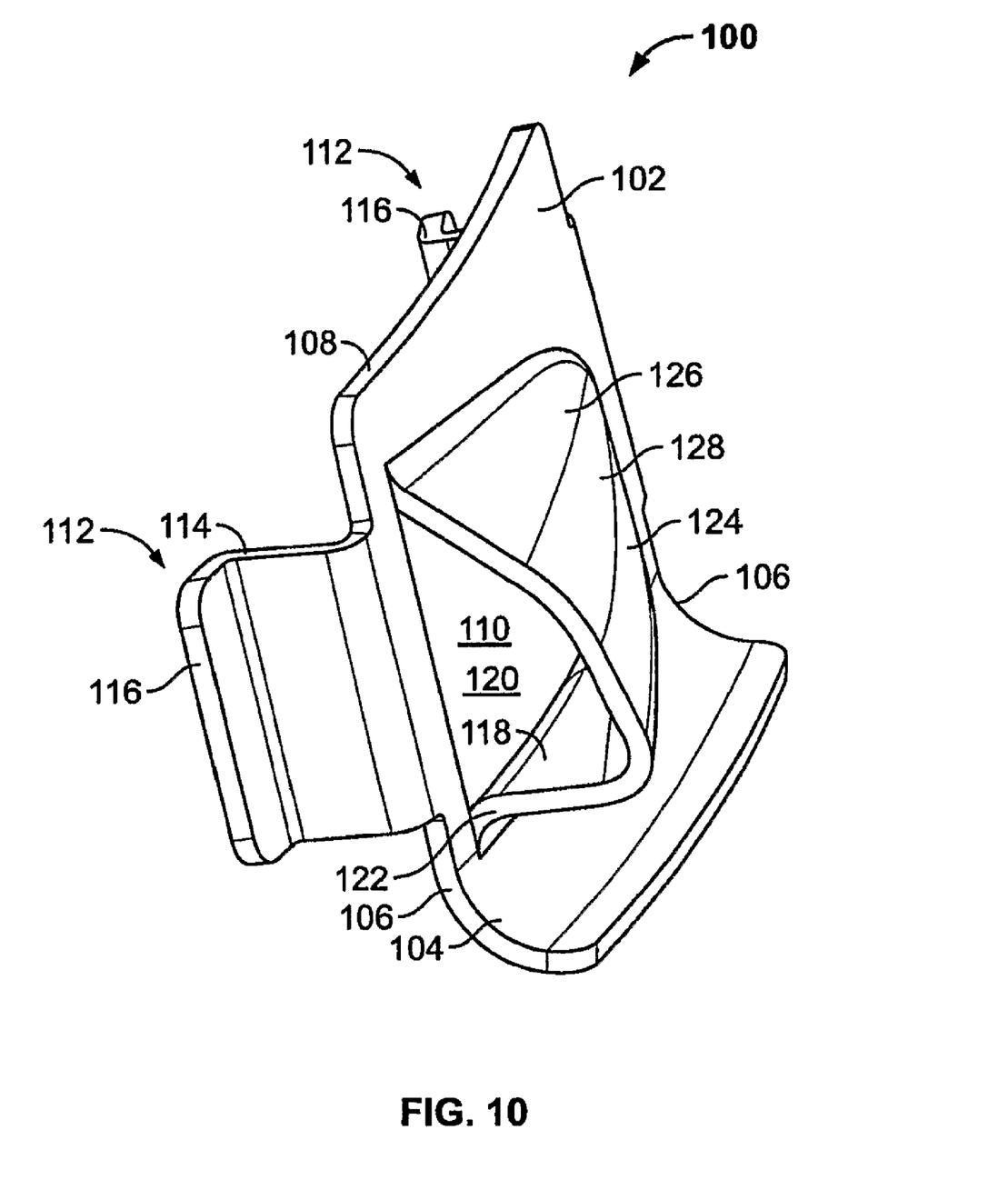
FIG. 10 shows a perspective view of the air scoop of FIG. 9, in accordance with the present invention.

The air scoop 100 of FIG. 9 is shown in the perspective view in FIG. 10. The air scoop includes a generally planar main body portion 102 having a curved portion 104. The planar main body portion and curved portion generally conform to the transition portion of the mounting flange portion as shown in FIG. 9. The main body portion includes two side edges 106 and an outboard edge 108. An opening 110 extends through the main body portion. A clip 112 extends from each of the side edges. Each clip includes a main flange portion 114 extending radially inward, and a lip portion 116. A louver 118 is located over the opening 110 and defines a louver opening 120. The louver includes an inboard wall 122 which is substantially at a right angle to the main body portion 102, an upper wall 124 which is substantially parallel to the main body portion 102, an outboard wall 126 which is inclined at approximately a 45° angle to the main body portion 102. The walls 122, 124, 126 taper downwardly away from the louver opening 120 to a back side 128 of the louver at the main body portion. The air scoop of FIG. 10 maybe installed in a brake drum via a snap fitted installation technique, wherein the clips extend through the vent opening into the brake drum cavity and the lip portion retains the scoop in position. Further, it will be appreciated that if the curved portion of the planar main body is omitted, the air scoop of FIG. 10 could be installed on a brake drum regardless of which side of the vehicle the brake drum is to be installed.

Figure 11:
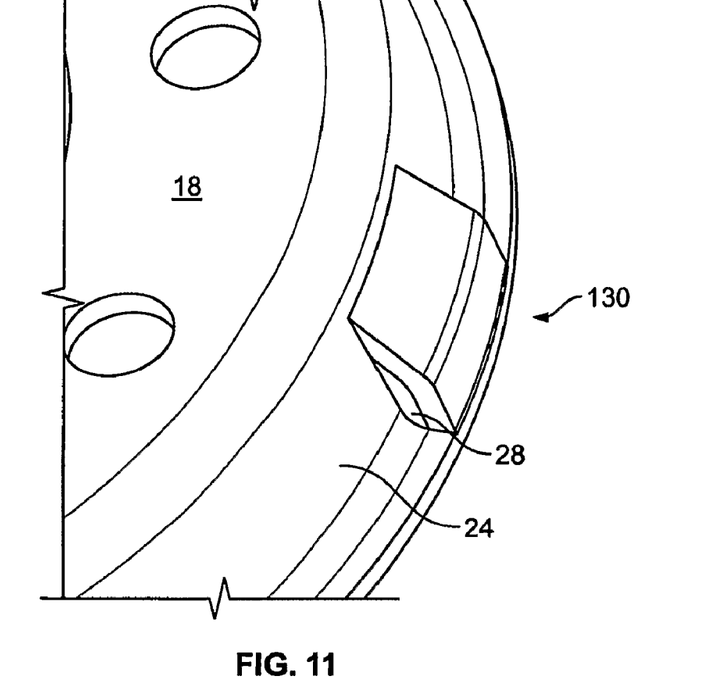
FIG. 11 is a fourth embodiment of the present invention and shows a partial perspective view of a mounting flange of a brake drum for use at the front of a vehicle, in accordance with the present invention.

FIG. 11 discloses a fourth embodiment of the present invention. In particular, FIG. 11 discloses a partial perspective view of a mounting flange of a brake drum. A mounting flange includes the transition portion having a plurality of vent openings (of which only one is shown). An air scoop 130 is shown at the vent opening.

Figure 12:
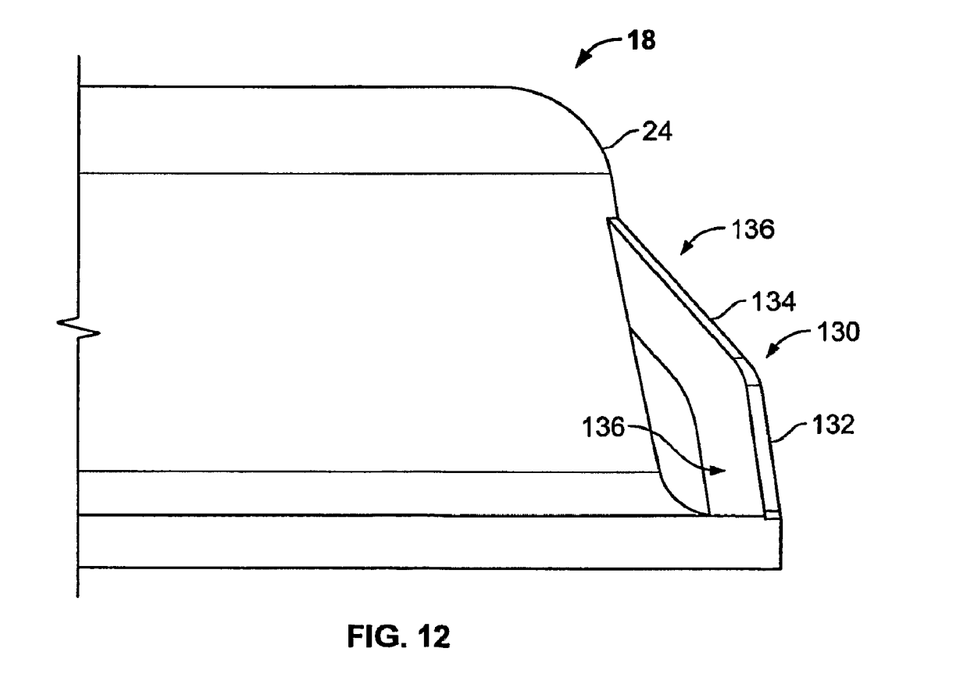
FIG. 12 shows a partial side view of the mounting flange of FIG. 11, having the air scoop in accordance with the present invention.

FIG. 12 is a partial side view of the mounting flange of FIG. 11. The air scoop 130 is shown to include a back wall 132 extending from an inboard portion of the transition portion toward the outboard side. The air scoop is further shown to include a side wall 134 extending from the back wall and radially outwardly toward the outboard side toward the transition portion. The air scoop forms dual opposing louver openings 136. The air scoop of FIGS. 11 and 12 maybe formed during a stamping and cutting process as an integral unit, or maybe a separate component which is individually secured to the mounting flange such as via welding.

It will be appreciated that a brake drum having a plurality of air scoops in accordance with the present invention maybe installed on the vehicle. The air scoops will be typically secured to the transition portion and/or cylindrical main body portion, and may be located within the air gap defined between the brake drum and wheel. Rotation of the wheel and brake drum combination will induce air flow into louver opening and into the brake drum cavity providing ventilation. Ventilation will aid in cooling, cleaning and the removing of debris. It will be further appreciated that the air scoops will have a tendency to prevent water from entering the brake drum such as during washing of the vehicle and wheels.

The present invention is applicable to a steel shell brake drum, a two-piece brake drum, a composite brake drum, a cast brake drum, and other embodiments, as will be appreciated.

What is claimed is:

1. A brake drum comprising:
   a cylindrical main body portion which defines a brake drum cavity;
   a brake drum mounting flange portion;
   a brake drum transition portion, the brake drum transition portion extending between the cylindrical main body portion and the mounting flange portion, the transition portion having at least one vent opening; and
   an air scoop secured to the brake drum at the vent opening, wherein the air scoop includes a louver having dual opposing openings, and a deflector surface located between the dual opposing openings, the air scoop is secured at the vent opening with the dual opposing openings each facing a respective direction of rotation of the brake drum, whereby rotation of the brake drum and air scoop induces air movement into the brake drum cavity and the air scoop will function properly regardless of whether the brake drum is located on the left side or right side of a vehicle.

2. The brake drum of claim 1, wherein the brake drum includes a plurality of vent openings, and an air scoop secured at each vent opening.

3. The brake drum of claim 1, wherein the brake drum is a full cast iron brake drum.

4. The brake drum of claim 1, wherein the brake drum is a steel shell brake drum.

5. The brake drum of claim 1, wherein the brake drum is a two-piece steel shell brake drum.

6. The brake drum of claim 1, wherein the brake drum is a composite brake drum.

7. The brake drum of claim 1, wherein the air scoop includes a substantially flat side wall having a bottom edge, top edge and opposing and parallel side edges, the bottom edge having a curved profile which substantially conforms to the transition portion, the top edge having a curved profile, a concave or curved back wall extends substantially at a right angle from the curved top edge, a curved or web side wall, opposite the flat side wall, extends from the curved back wall radially inwardly, and a main body portion extends from the webbed angular side wall, whereby the concave back wall deflects air movement radially inward toward the brake drum cavity.

8. The brake drum of claim 7, wherein the air scoop is welded to the brake drum.

9. The brake drum of claim 1, wherein the air scoop includes a substantially flat side wall having a bottom edge, top edge and opposing and parallel side edges, the flat side wall is in engagement with the brake drum transition portion, the bottom edge having a curved profile which substantially conforms to the transition portion, the top edge having a convex or curved profile, a convex or curved back wall extends substantially at a right angle from the curved top edge, an angled side wall, opposite the flat side wall, extends from the curved back wall radially inwardly, and a mounting flange extends from the angled side wall, and a webbed wall or deflective surface extends from the flat side wall to the angled side wall, whereby the deflective surface deflects air movement radially inward toward the brake drum cavity.

10. The brake drum of claim 9, wherein the air scoop is welded to the brake drum.

* * * * *